United States Patent [19]

Merz et al.

[11] Patent Number: 5,511,300
[45] Date of Patent: Apr. 30, 1996

[54] APPARATUS AND METHOD FOR ASSEMBLING DISKS TO AN ARBOR

[75] Inventors: Gary E. Merz, Rochester; Dale C. Marshall, Hamlin; Daniel D. Sutton, Rochester, all of N.Y.

[73] Assignee: Eastman Kodak Company, Rochester, N.Y.

[21] Appl. No.: 285,374

[22] Filed: Aug. 3, 1994

[51] Int. Cl.$^6$ .................................. B23P 21/00
[52] U.S. Cl. ................ 29/407.08; 29/453; 29/709; 29/714; 29/717; 29/806
[58] Field of Search ................. 29/240, 407, 453, 29/705, 709, 714, 717, 806

[56] References Cited

U.S. PATENT DOCUMENTS 3,605,238 9/1971 Eschholz ............................ 29/717
4,974,316 12/1990 Suzuki et al. ....................... 29/806
5,172,470 12/1992 Ichikawa et al. .................... 29/806

FOREIGN PATENT DOCUMENTS

622662A2 11/1994 European Pat. Off. ............ 29/806

*Primary Examiner*—S. Thomas Hughes
*Attorney, Agent, or Firm*—Clyde E. Bailey, Sr.

[57] ABSTRACT

A spool (10) including a core (12) and end disks (18, 24) retained by tabs (16, 22) is assembled by sliding each end disk over the core into proximity with its associated tabs, contacting the end disk with at least a single point tool (106; 228–252) and rotating the tool to snap the disks past the tabs one by one. A transducer assembly (142–160) measures axial force applied to the core to detect successful installation of each end disk.

14 Claims, 16 Drawing Sheets

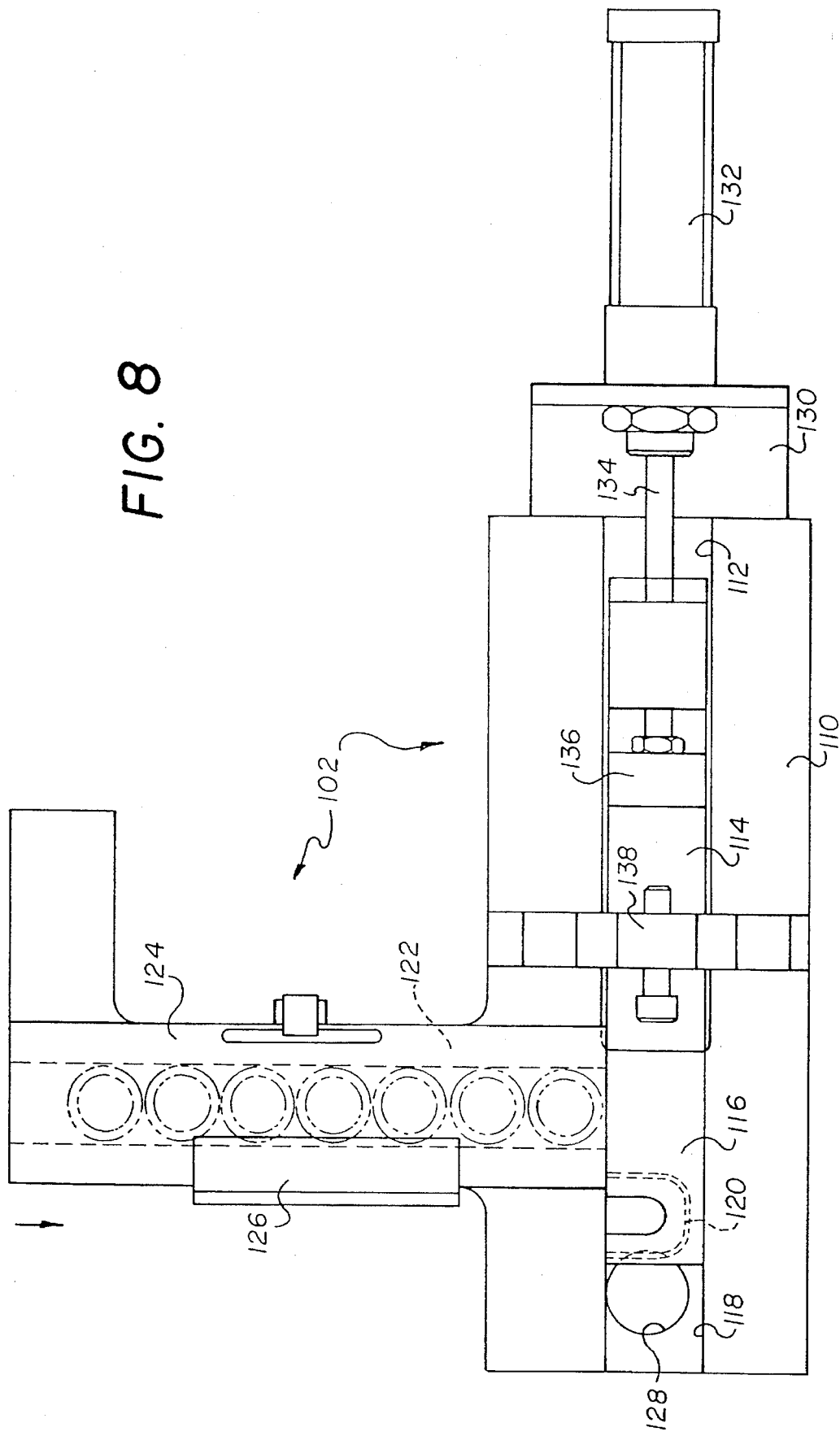

5,511,300

APPARATUS AND METHOD FOR ASSEMBLING DISKS TO AN ARBOR

TECHNICAL FIELD

The invention concerns apparatus and methods for assembling parts onto an arbor. More particularly, the invention is related to such apparatus and methods for installing flexible end disks onto a core for a spool for winding strips of photographic film.

BACKGROUND ART

As disclosed in commonly assigned U.S. Pat. No. 5,296,887, recently developed cartridges for strips of photographic film have been designed to enclose a multi-part spool onto which the film strip is wound. FIGS. 1 and 2 of the present specification illustrate such a spool 10 which can be assembled using the apparatus and method of our invention. The central core or arbor 12 of the spool includes features for attachment of a film strip by rotating core 12 about its longitudinal axis 12'. Near one end of core 12, a large end flange 14 is provided which is axially spaced a small distance from a plurality of radially protruding, circumferentially spaced retainer tabs or protuberances 16. Rather than tabs 16, a complete annular retaining flange could be used. At least three tabs 16 are used, though as many as six may be preferable. To prevent a wound strip from telescoping along core 12, and for other purposes, a flexible, ranged end disk 18 is provided having a central opening 18' sized to fit core 12 between tabs 16 and flange 14. Near the other end, a small end flange 20 similarly is provided which is spaced axially a small distance from a plurality of radially protruding, circumferentially spaced retainer tabs or protuberances 22. Again, three to six such tabs are used, or an annular retaining flange. A flexible, ranged end disk 24 is provided having a central opening 24' sized to fit core 12 between tabs 22 and flange 20. End disks 18, 24 may be made from a suitable plastic material and may have a thickness of about 0.006 inch (0.152 mm), thus permitting the material surrounding openings 18', 24' to flex sufficiently to allow the disks to be installed past tabs 16, 22.

A spool having this design must be assembled precisely and rapidly for efficient manufacture of the associated photographic film product. The disks must be installed without damage. Merely pushing disks 18, 24 straight along core 12 and forcing them over tabs 16, 22, respectively, risks unacceptable deformation of the disks as they must then flex to clear all of the tabs more or less simultaneously. Proper and improper installation of the disks must somehow be detectable to ensure that no defective spools are supplied for use in a final product. While manual assembly and verification are possible, the rate of production would be too slow for efficient manufacture.

SUMMARY OF THE INVENTION

Our invention is defined by the claims. One embodiment of our apparatus is particularly useful for assembling (i) an arbor having an axis and one or more radially extending protuberances for positioning a part and (ii) a part having a through opening for axially receiving the arbor. The apparatus may comprise means for holding the arbor; means for sliding the part onto the arbor; means for applying axial force to the part at one point or at a plurality of closely spaced points positioned radially from the axis while moving the point or points of application around the axis, thereby moving the part past the protuberances; means for measuring axial force applied to the arbor as an indication that the part has passed the protuberances; and means for ceasing the applying of force in response to the indication.

The means for holding the arbor may comprise a base block; a first and pivotably mounted to the base block; means on the first arm for receiving arbor at a location spaced axially from the protuberances; a second arm mounted on the base block; and means for biasing the first arm toward the second arm to hold the part between the arms. The base block may be mounted on a pallet for movement on a conveyor. The means for holding the arbor may include means for rotating the first arm away from the second arm to permit the part to move axially in response to the axial force. The means for holding also may comprise a conveyor for moving the base block, with an arbor held between the first and second arms, to a position for installation of the part; and means mounted adjacent the conveyor for engaging the means for rotating. The means for engaging may be located on a slider above the conveyor to permit its being moved to an inoperative position below which a pallet may pass without engagement. The same slider may also support a stop for limiting rotation of the first arm away from the second arm following engagement with the means for rotating. Means may be mounted adjacent the conveyor for positioning the pallet and base block transversely of the conveyor during installation of the part. The means for measuring axial force may comprise a force transducer; an engagement pad connected to the force transducer; and means for moving the transducer and pad into contact with an end of the arbor prior to application of the axial force.

The means for sliding the part onto the arbor may comprise a tool member having a central bore for telescopically receiving a portion of the arbor; an end portion surrounding the central bore for supporting the part; and means for moving the tool member to insert the arbor through the opening of the part and into the central bore, while the part is supported on the end portion. The means for applying axial force may comprise a spiral ramp surrounding the central bore, the ramp having a leading edge for engaging the part at the point of application; and means for rotating the tool member to move the point around the axis and move the opening of the past past the protuberance. Finally, means may be provided for placing the part on the end portion of the tool member.

The method of our invention is useful for assembling (i) an arbor having an axis and a plurality of radially extending protuberances for positioning a part and (ii) a part having a through opening for axially receiving the arbor. The method may comprise the steps of holding the arbor; sliding the part onto the arbor; applying axial force to the part at least at one point of application spaced radially from the axis while moving the point around the axis, thereby moving the part past the protuberances; measuring axial force applied to the arbor as an indication that the part has passed the protuberances; and ceasing the applying of force in response to the indication. A tool member may be provided having a central bore for telescopically receiving a portion of the arbor and a spiral ramp surrounding the central bore, the ramp having a leading edge for engaging the part at the point of application. Our method then comprises the further steps of moving the tool member to insert the arbor into the central bore following sliding of the part onto the arbor; and rotating the tool member while applying axial force to the part.

Our invention provides various advantages. End disks of various materials and thicknesses can be installed with ease. The rotatable tool with single point contact reduces the force required to press the end disks past the retainer tabs, thus minimizing chances for damage to the end disks. This is because the single point tool presses the end disk past each retainer tab individually, thus allowing the disk to move somewhat radially to avoid minimize contact between the disk and the remaining tabs. Thus, the end disks do not have to be overly precisely positioned on the installation tool member before rotation begins. Measurement of the axial force during installation provides a simple, reliable means to verify proper installation.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 8 shows a plan view of a means for feeding end disks in the apparatus of FIGS. 6 and 7.

DESCRIPTION OF THE PREFERRED EMBODIMENTS

Figure 1:
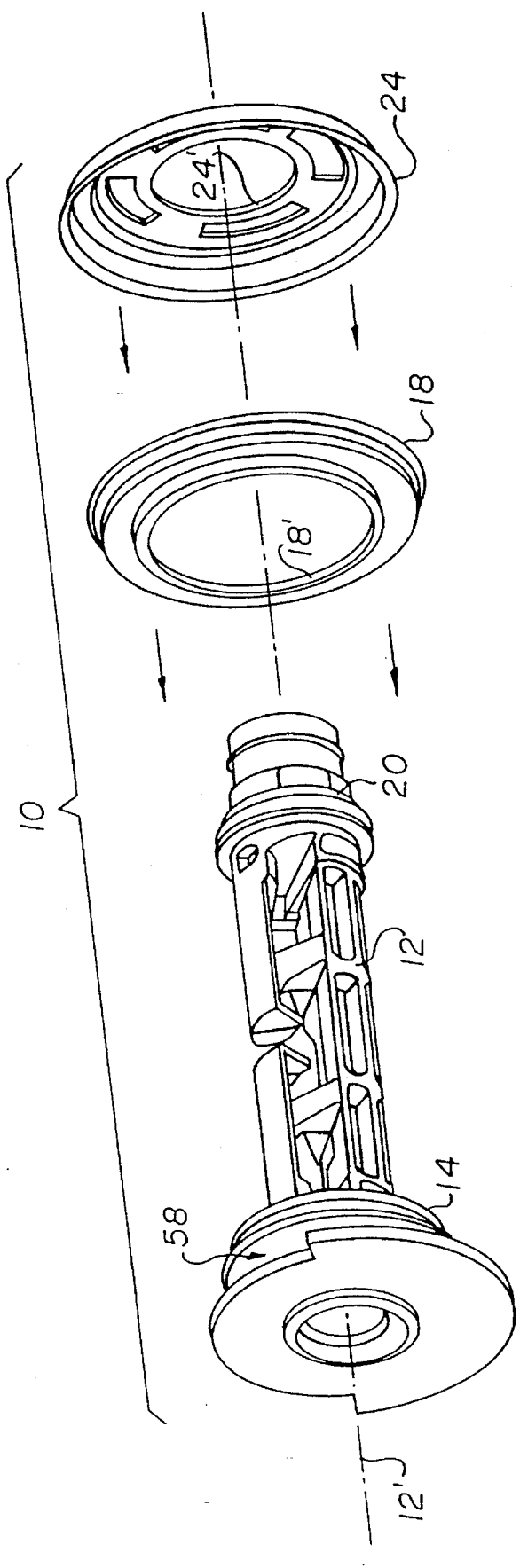
FIG. 1 shows a perspective, exploded view of a spool that may be assembled using the method and apparatus of our invention.

The following is a detailed description of the preferred embodiments of the invention, reference being made to the drawings in which the same reference numerals identify the same elements of structure in each of the several Figures.

Figure 3:
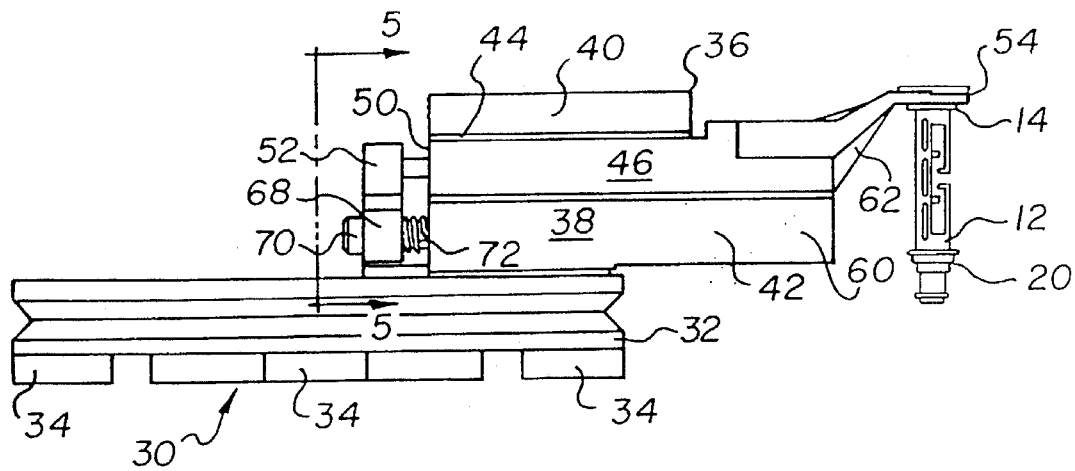
FIG. 3 shows a side elevation view of a pallet used to hold the spool during installation of the end disks.
Figure 4:
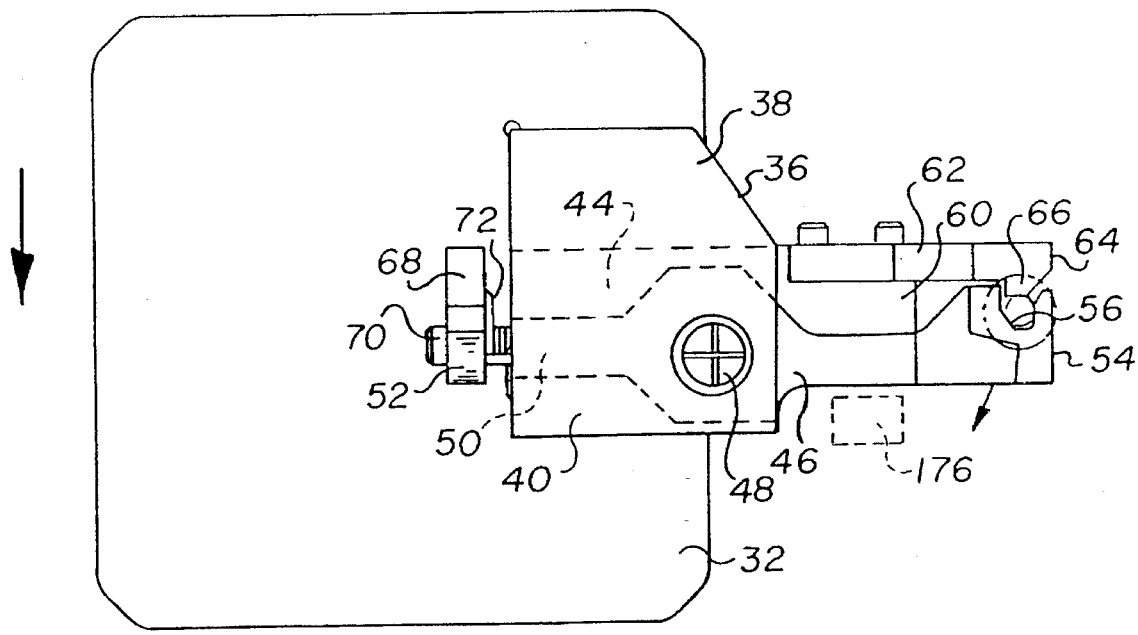
FIG. 4 shows a top view of the pallet.
Figure 5:
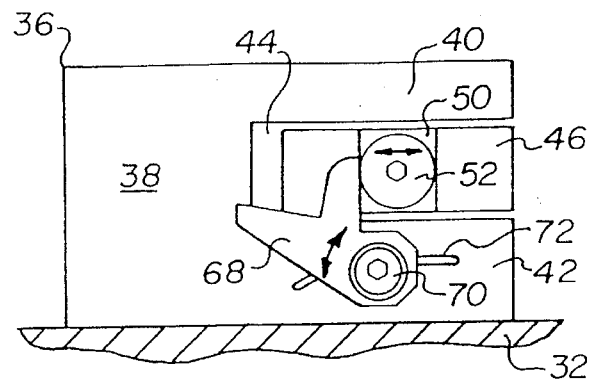
FIG. 5 shows a back elevation view of the pallet, taken along line 5–5 of FIG. 3.

FIGS. 3 to 5 illustrate a pallet assembly 30 for holding core 12 during installation of end disks 18, 24. A rectangular base plate 32 is provided on its under surface with pads or glides 34 which may be made from a low friction material such as Nylon or Teflon or the like. On its upper surface, plate 32 supports a spool nest 36 which includes a base block 38 suitably attached to plate 32. Extended horizontally from base block 38 are a top flange 40 and a bottom flange 42, between which a recess 44 is defined. An elongated pivot arm 46 is rotatably mounted in recess 44 on a conventional flexural pivot 48 extended between flanges 40,42. A nest actuation end 50 of pivot arm 46 supports a cam follower roller 52 whose purpose will be discussed shortly. A spool engagement end of pivot arm 46 includes a recess 56 which engages a reduced diameter 58 on core 12 above flange 14 and tabs 16, to hold the core vertically for installation of the end disks. Thus, when roller 52 is moved to the left as viewed in FIG. 5, pivot arm 46 will rotate in the direction of the arrow in FIG. 4, first to permit insertion of core 12 for movement with pallet 30 and later to just crack open the nest to permit core 12 to move axially slightly during installation of end disks 18, 24. An extension 60 of bottom flange 42 supports an upwardly and outwardly extended fixed arm 62. An engagement end 64 of fixed arm 62 includes a nest stop surface 66, opposite recess 56, which also engages reduced diameter 58 on core 12. Flexure 48 biases surface 66 toward recess 56. Below recess 44, bottom flange 42 supports a pivot arm keeper pawl 68 which is rotatably mounted on a bolt 70 and biased by a torsion spring 72 clockwise into contact with roller 52 to bias pivot arm 46 toward fixed arm 62. Before initial insertion of core 12 between recess 56 and stop surface 66, pawl 68 is rotated counter-clockwise, as viewed in FIG. 5, manually or automatically by structure not illustrated, to permit pivot arm 46 to rotate sufficiently for insertion of the core. Upon release, pawl 68 then forces the pivot toward the fixed arm to secure the core for installation of the end disks.

Figure 7:
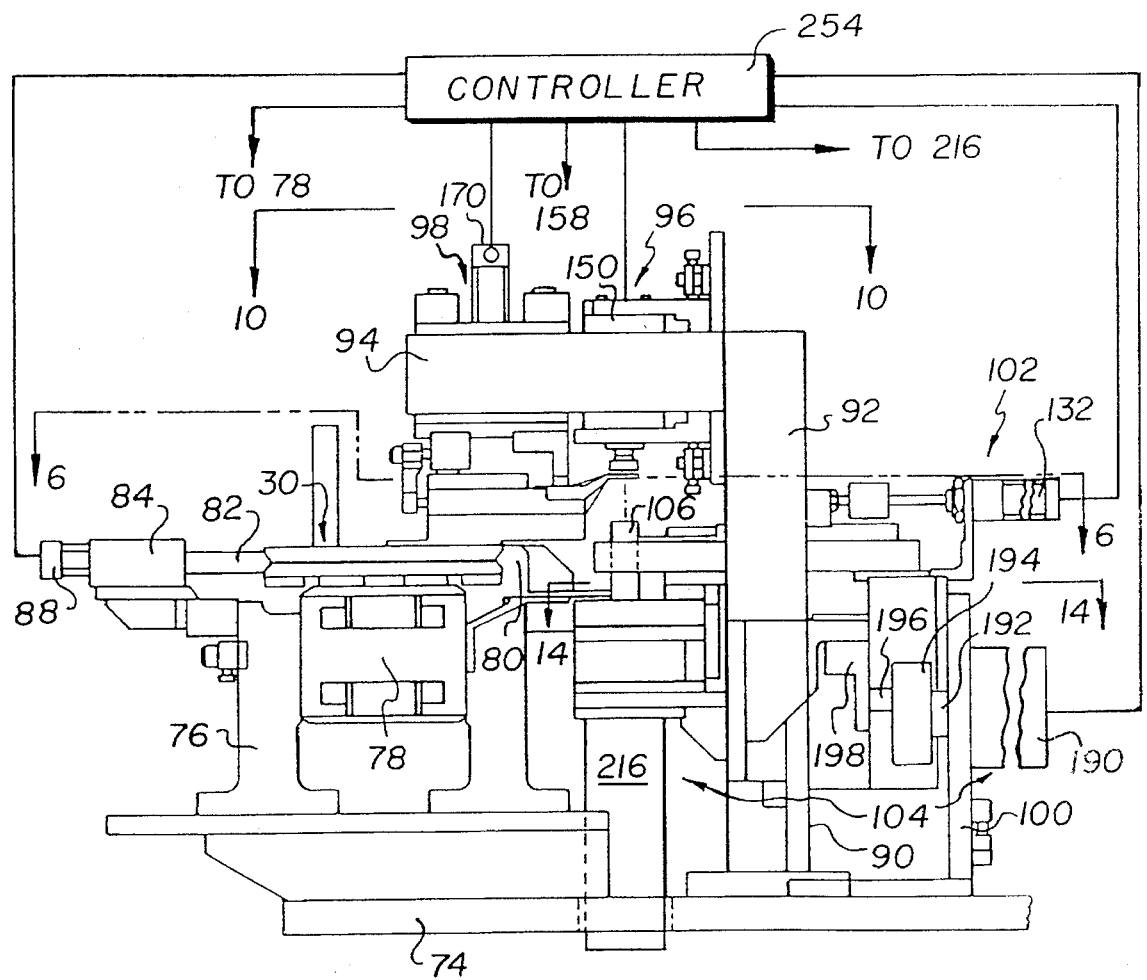
FIG. 7 shows a simplified elevation view of the overall apparatus.
Figure 6:
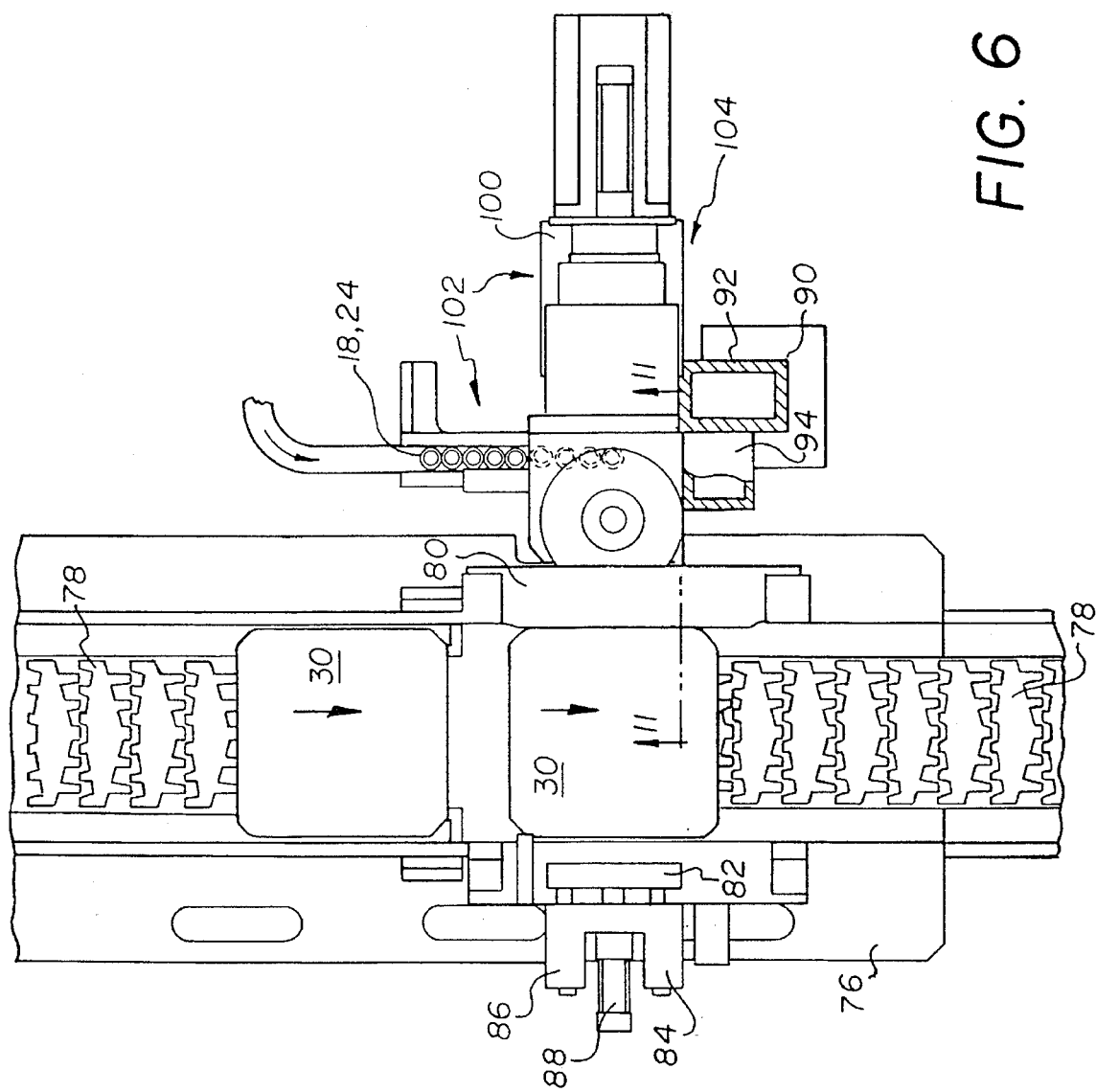
FIG. 6 shows a simplified plan view of the overall apparatus, taken along line 6—6 of FIG. 7.

FIGS. 6 and 7 illustrate the overall apparatus of our invention used for installation of end disks 18, 24. In practice, two of the illustrated apparatus are used, one for installation of disk 18 and the other for installation of disk 24, the primary difference between the two being the tool members illustrated in FIGS. 17 and 18. A base plate 74 supports a frame 76 on which a conventional conveyor 78 is supported for moving pallets 30 from one installation apparatus to the next. Adjacent conveyor 78, a fixed lateral guide 80 is mounted for engaging one edge of each pallet. On the opposite side of conveyor 80, a movable lateral guide 82 is supported by a pair of slides 84, 86 for movement by an air cylinder 88 into and out of engagement with the opposite edge of each pallet. Tires, each pallet can be precisely positioned transversely to the axis of movement of conveyor 78. An extendable stop, not illustrated, may be used to stop movement of the pallet between guides 80, 82.

Figure 10:
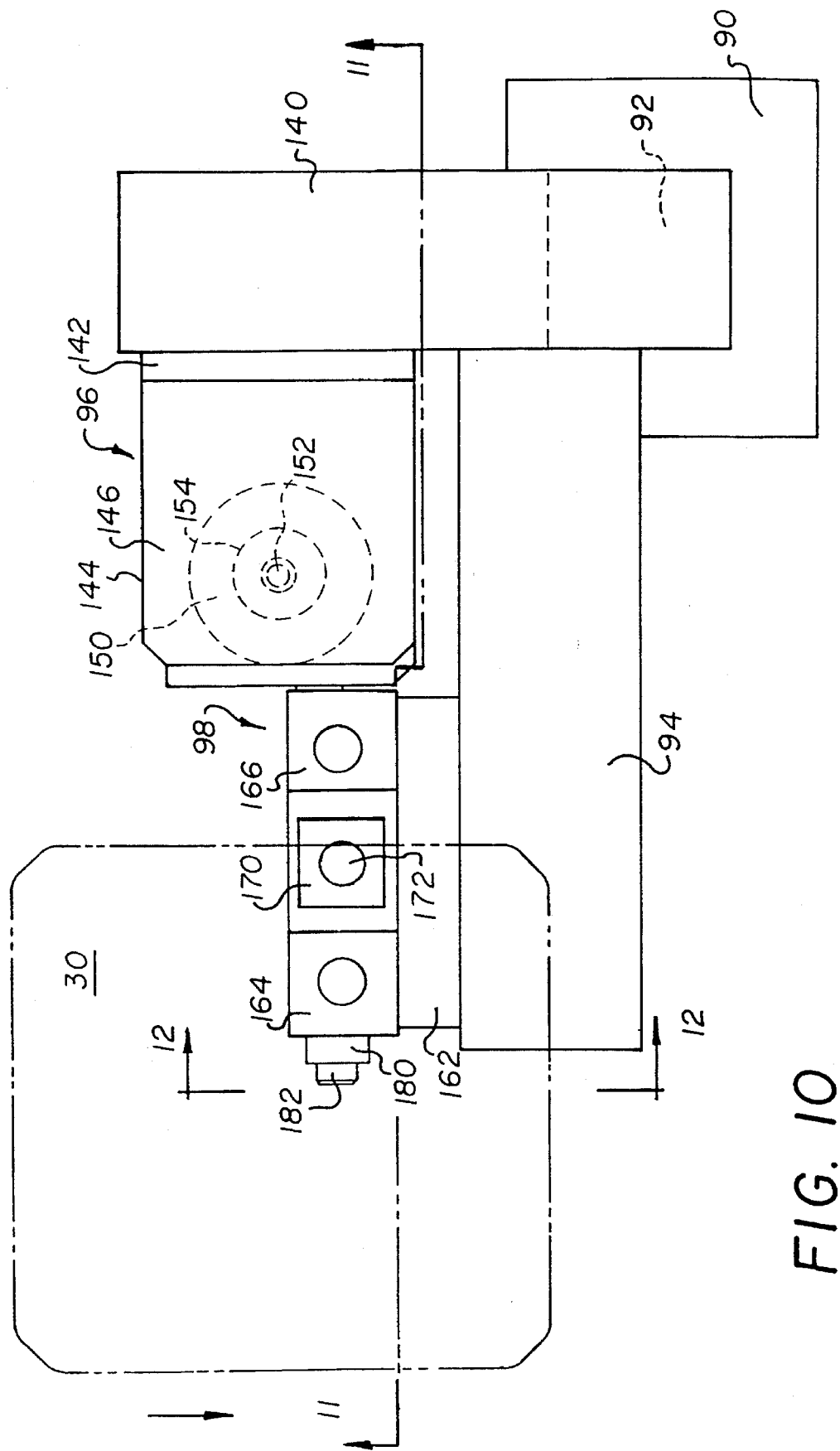
FIG. 10 shows a simplified plan view of the apparatus of FIGS. 6 and 7.
Figure 11:
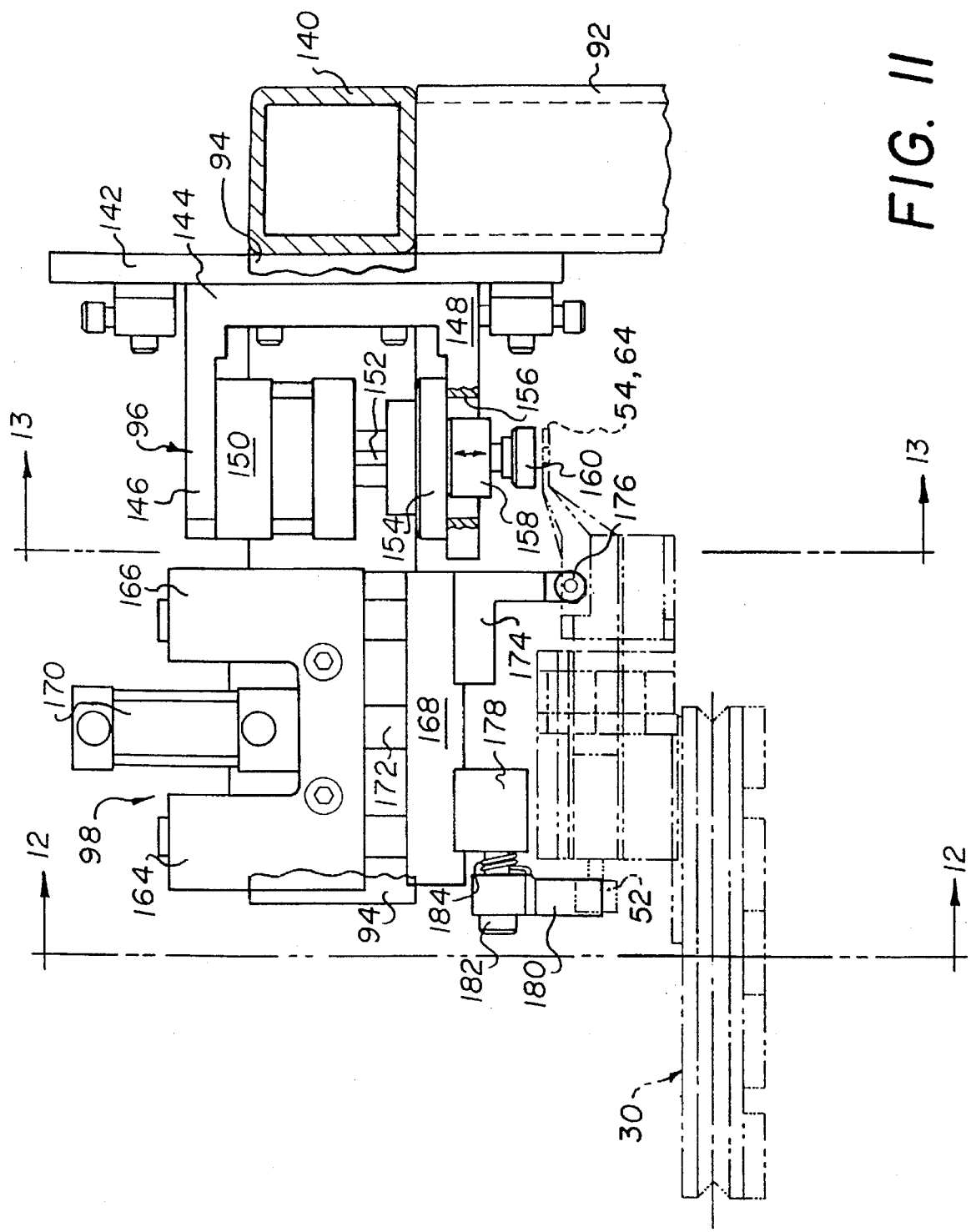
FIG. 11 shows a simplified elevation view, partially broken away and partially in section, of the apparatus of FIG. 10.
Figure 13:
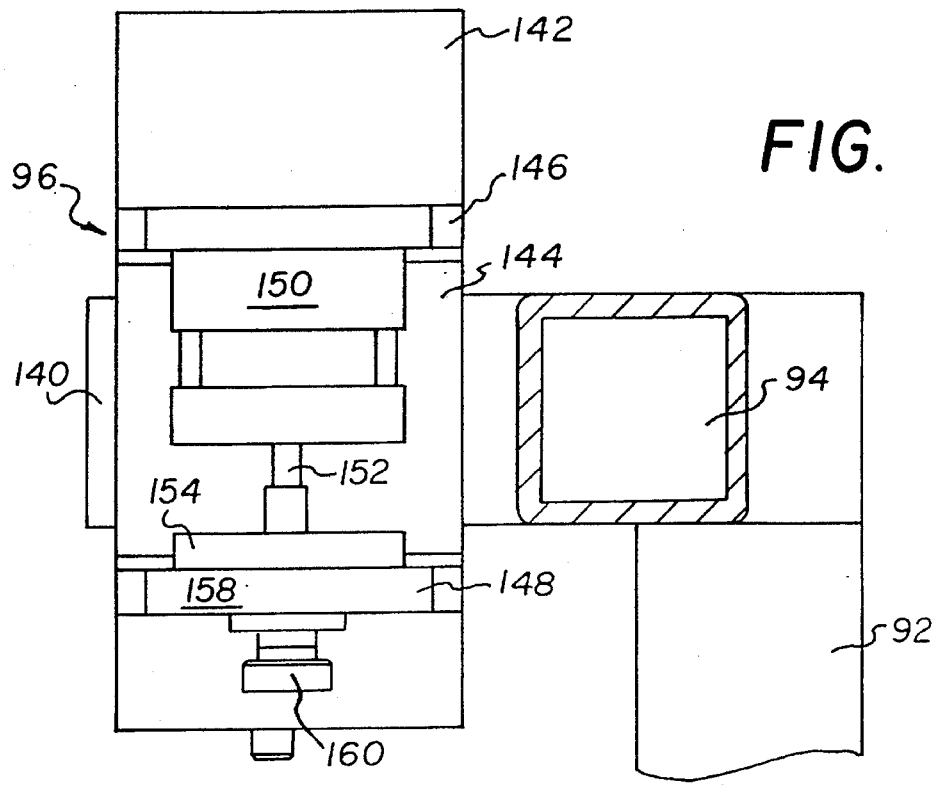
FIG. 13 shows an end view of a means for measuring force applied to the spool during installation of an end disk, taken along line 13—13 of FIG. 11.
Figure 12:
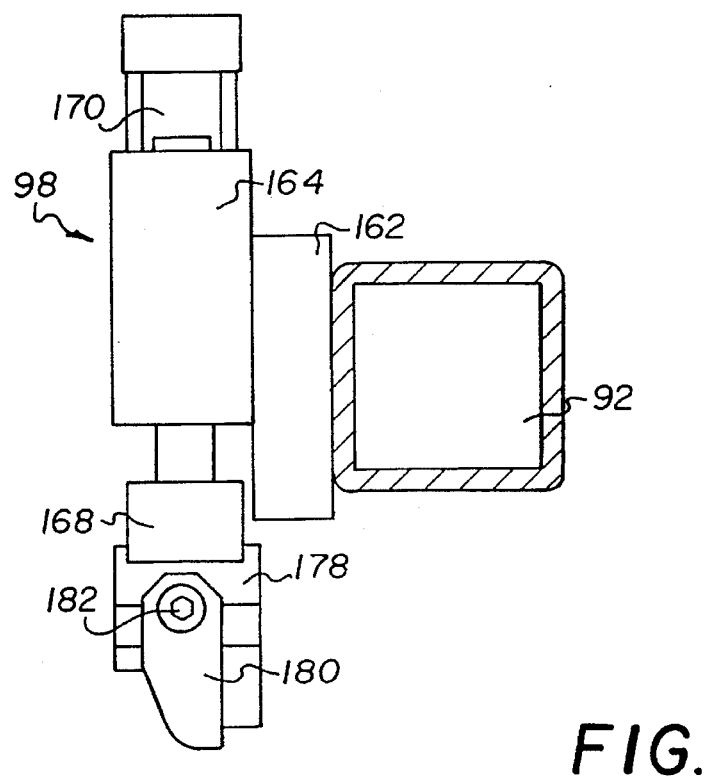
FIG. 12 shows an end view of a means for cracking the nest in the apparatus of FIGS. 6 and 7, taken along line 12—12 of FIG. 11.

Adjacent to conveyor 78 a support stand 90 is mounted to base plate 74 and includes a vertical leg 92 and a horizontal arm 94. A force transducer assembly 96 is mounted to arm 94 near leg 92 and above the path of movement of each core 12 on its associated pallet 30, as shown more fully in FIGS. 10, 11 and 13. A nest cracking assembly 98 is mounted to arm 94 outboard of leg 92 and above the paths of movement of pawl 68 and pivot arm 46, as shown more fully in FIGS. 10, 11 and 12. Also mounted on base plate 74 is a support frame 100 on which are mounted an end disk delivery shuttle assembly 102, shown more fully in FIGS. 8 and 9; and an end disk installation assembly 104, shown more fully in FIGS. 14 to 18.

In operation of the overall apparatus of FIGS. 6 and 7, pallets 30 move along conveyor 78 after insertion of cores 12 between arms 46 and 62 by means not illustrated. Each pallet stops adjacent guide 80. Guide 82 then moves to position the pallet between the two guides. Just prior to arrival of pallet 30 between guides 80, 82, nest cracking assembly 98 extends a feature to engage pawl 68 and crack open the nest to allow axial movement of core 12. The appropriate end disk is delivered by assembly 102 and positioned on an end disk installation tool member 106, shown more fully in FIGS. 16 to 18. Transducer assembly 96 then extends a contact pad to engage the upper end of the core. Installation assembly 104 then raises tool member 106 to telescopically engage core 12 and slide the end disk into position below the tabs on the core. Assembly 104 then rotates tool 106 to move the end disk past the tabs and complete installation. During rotation of tool 106, transducer assembly 96 monitors the force applied axially to the core. When the measured force indicates successful installation of the end disk, as illustrated in FIGS. 19 and 20, rotation of tool 106 is stopped and the tool is lowered. Pallet 30 then is released from between guides 80, 82 and moved on by conveyor 78.

Figure 9:
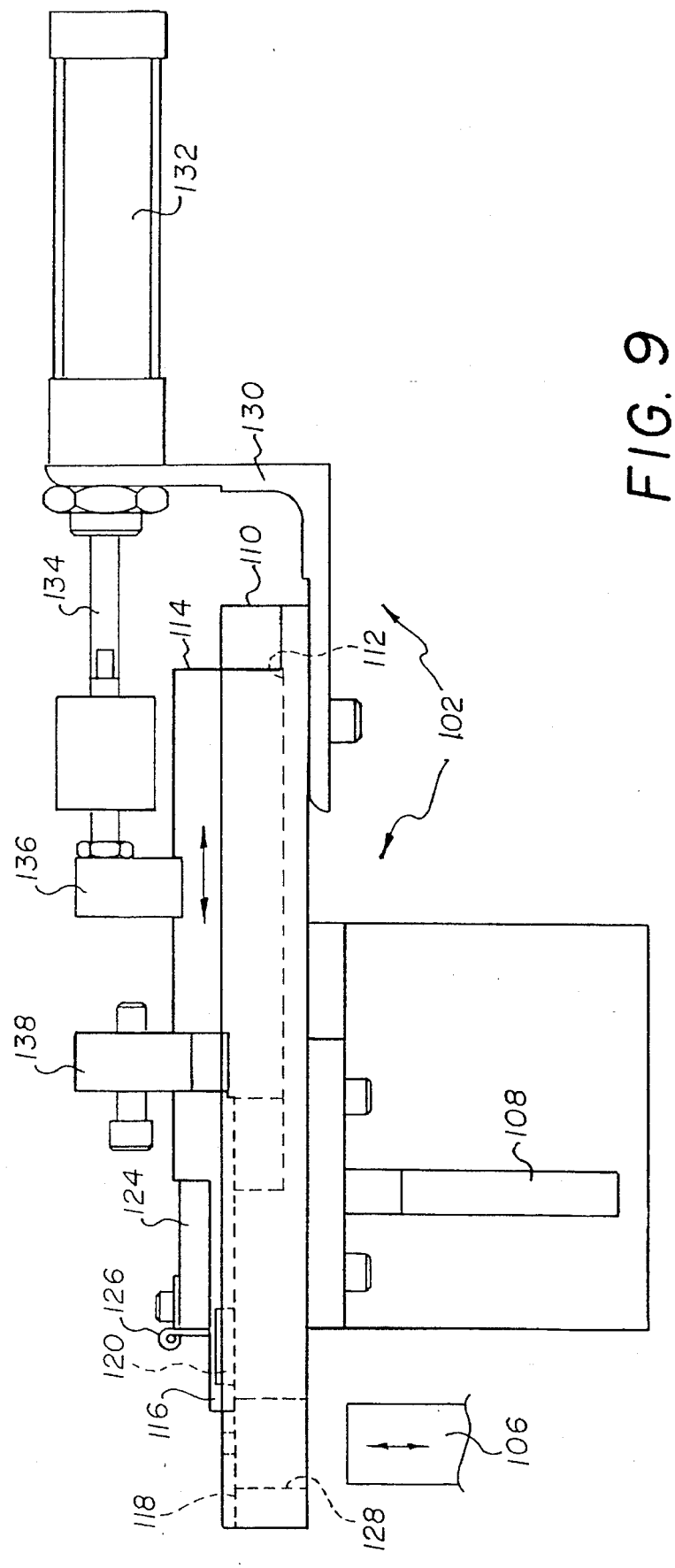
FIG. 9 shows an elevation view of the apparatus of FIG. 8.

FIGS. 8 and 9 illustrate the primary components of end disk delivery shuttle assembly 102. A bracket 108 is mounted to frame 100 to support a horizontally extended, elongated block 110. An upwardly opening, elongated slot or track 112 is provided in block 110 to slidably receive an elongated shuttle member 114. At one end, the shuttle member includes a reduced thickness extension 116 which is slidably positioned in a reduced depth extension 118 of track 112. On the under side of extension 116, an U-shaped recess 120 opens through one edge of the extension. Recess 120 has a geometry appropriate to receive end disks 18, 24 from an adjacent feed track 122 along which the end disks are moved by conventional means such as vibrating feeders and air tracks, not illustrated. The outfeed end of track 122 may be closed by a cover plate 124 mounted on a hinge 126 to permit ready clearing of any jammed disks. A bore 128 is provided downwardly through the bottom wall of extension 118, the diameter of bore 128 being just slightly larger than that of the end disks. At the opposite end of block 110, a bracket 130 supports an air cylinder 132 whose rod 134 is operatively connected to a stop abutment 136 attached to shuttle 114. A stop assembly 138 is mounted to block 110 and straddles shuttle 114 in position to coact with abutment 136.

In operation of assembly 102, shuttle 114 is positioned by cylinder 132 to enable a disk to enter recess 120 from feed track 122. Cylinder 132 then moves shuttle 114 until recess 120 is positioned directly above bore 128 in which the upper end of tool member 106 has previously been positioned. The end disk then drops into position on the end of the tool where it is engaged by the features shown in FIGS. 17 and 18. Cylinder 132 then withdraws shuttle 114 to permit tool 106 to be moved upward through bore 128 into engagement with the core held on pallet 30. After the end disk has been installed in the manner to be discussed shortly, tool 106 is moved downward to a position to receive the next end disk.

FIGS. 10 to 13 illustrate the primary components of force transducer assembly 96 and nest cracking assembly 98.

Support stand 90 includes a further horizontal arm 140 transverse to arm 94. Assembly 96 comprises a mounting plate 142 secured to arm 140. A U-shaped bracket 144 includes an upper arm 146 and a lower arm 148 between which an air cylinder 150 is mounted. An actuator rod 152 of cylinder 150 is operatively attached to a stop plate 154 which engages lower arm 148 when rod 152 is extended. A bore 156 is provided through lower arm 148 to accommodate a conventional load cell 158 mounted to the under side of stop plate 154. An engagement pad 160 is mounted to the under side of load cell 158 in position to engage the top of core 12 when rod 152 is extended. In practice, pad 160 may move down only about 0.005 inch (0.127 mm) to press pad 160 into engagement with the upper end each core 12 held by a pallet 30. Then, when the output of load cell 158 indicates whether or not the end disk has been installed, cylinder 150 retracts rod 152 in preparation for arrival of the next pallet.

Nest cracking assembly 98 comprises a mounting plate 162 secured to arm 94. A pair of slides 164, 166 is mounted essentially vertically on plate 162 and supports a mounting block 168 extended transversely above conveyor 78 and pallet 30. An air cylinder 170 is mounted on plate 162 with its rod 172 operatively connected to block 168. At one end of block 168 is mounted a downwardly extended stop arm 174 having a stop pad 176 at its lower end to engage and limit the movement of pivot arm 46, as indicated in phantom lines in FIG. 4. At the other end of block 168 is mounted a block 178 which supports a cam finger 180 rotatably mounted on a bolt 182 and biased against rotation by a torsion spring 184. In operation of assembly 98, just before the arrival of a pallet 30, cylinder 170 is actuated to extend rod 172 and lower block 168 so that pad 176 is positioned to engage pivot arm 46. At the same time, cam finger 180 is lowered into the path of cam follower roller 52. When pallet 30 arrives, finger 180 engages roller 52 to pivot arm 46 and crack open the nest to permit axial movement of core 12.

Figure 14:
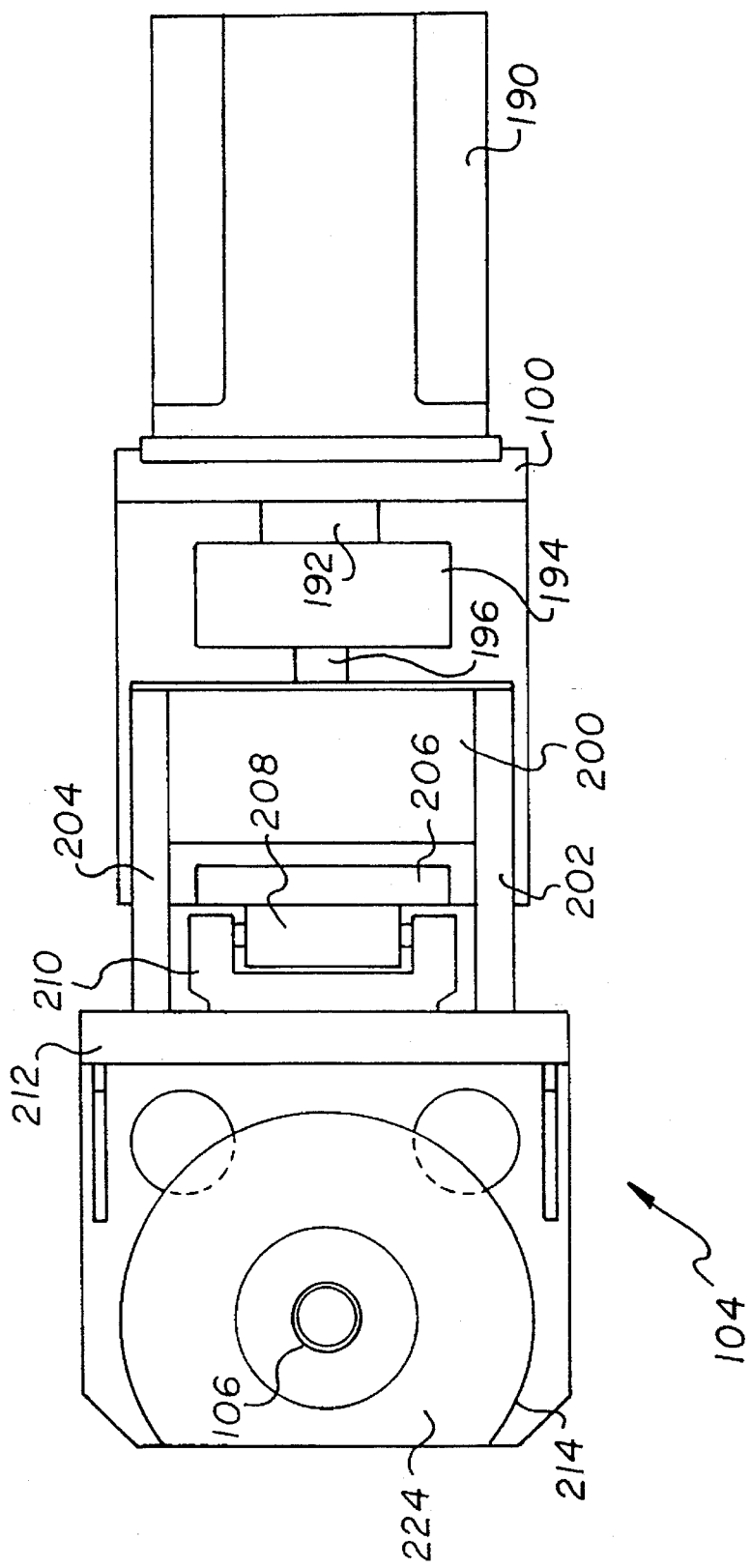
FIG. 14 shows a plan view of a means for installing end disks in the apparatus of FIGS. 6 and 7, taken along line 14—14 of FIG. 7.
Figure 15:
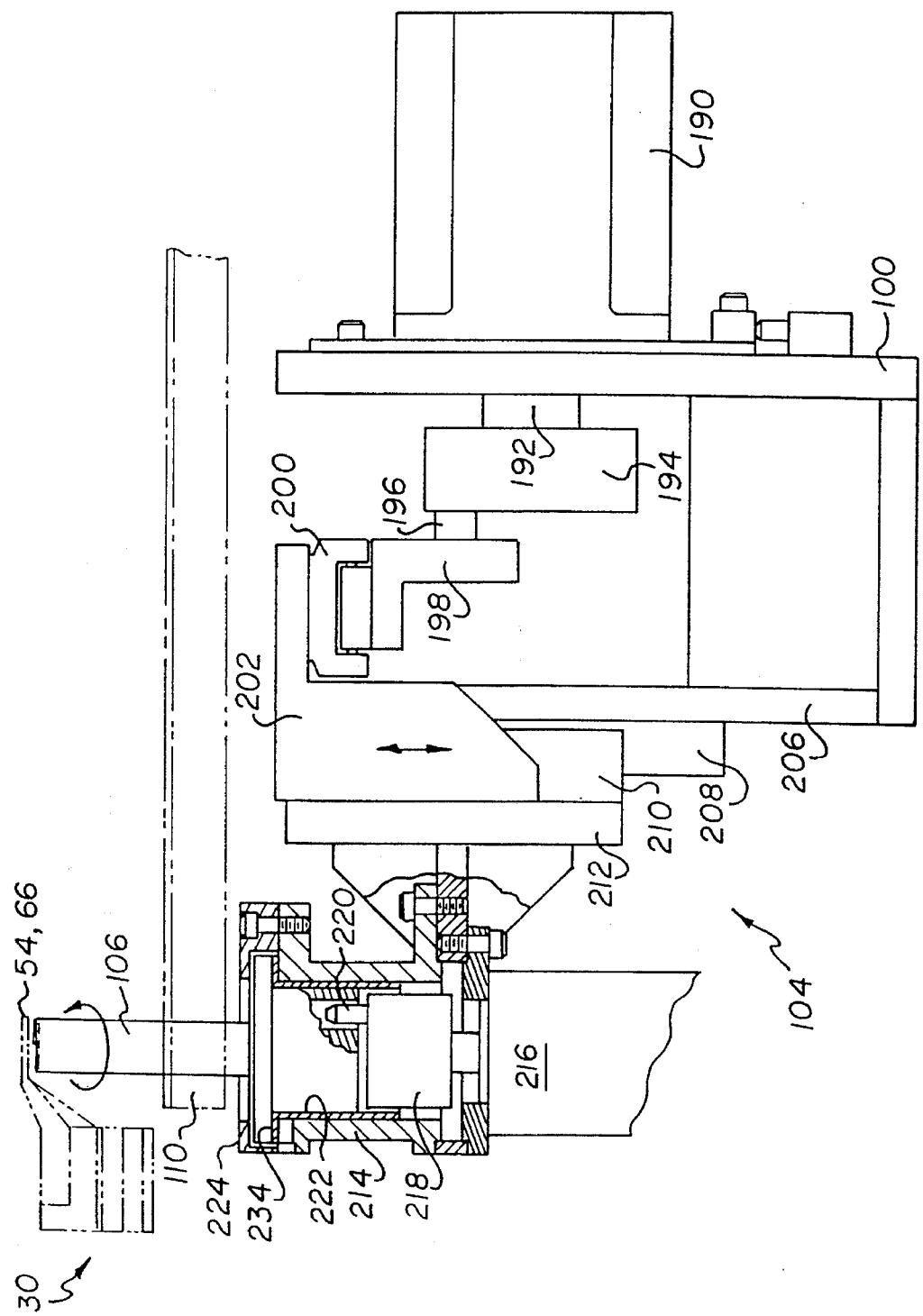
FIG. 15 shows an elevation view, partially in section, of the apparatus of FIG. 14.

FIGS. 14 and 15 illustrate the primary components of end disk installation assembly 104. Frame 100 supports a motor 190 having an output shaft 192 on which is mounted a driver hub 194. Extended from hub 194 is an eccentric drive pin 196 which rotatably engages a slide block 198 mounted for transverse movement in a slide 200. Attached to slide 200 are a pair of angled bracket plates 202, 204 between which is positioned a bracket plate 206 extended upwardly from frame 100. A slide block 208 is mounted to the upper portion of plate 206 in position to engage a slide 210. A motor mounting bracket 212 is secured to slide 210 and to bracket plates 202, 204. A cylindrical bearing housing 214 is mounted to an upper surface of bracket 212. Beneath housing 214 on an under surface of bracket 212 is mounted a motor 216 operatively connected to a driver hub 218. An eccentric drive pin 220 extends from hub 218 to engage tool member 106. A sleeve bearing 222 is mounted within housing 214 to rotatably support tool 106. Finally, a tool retainer plate 224 captures tool 106 within housing 214. In operation of the apparatus of FIGS. 14 and 15, motor 190 rotates hub 194 which causes pin 196 to move on a circular path. Block 198 thus moves back and forth within slide 200 and, simultaneously, slide 210 moves up and down on slide block 208 to advance and retract tool 106. Motor 216 rotates tool 106 to install each end disk.

Figure 2:
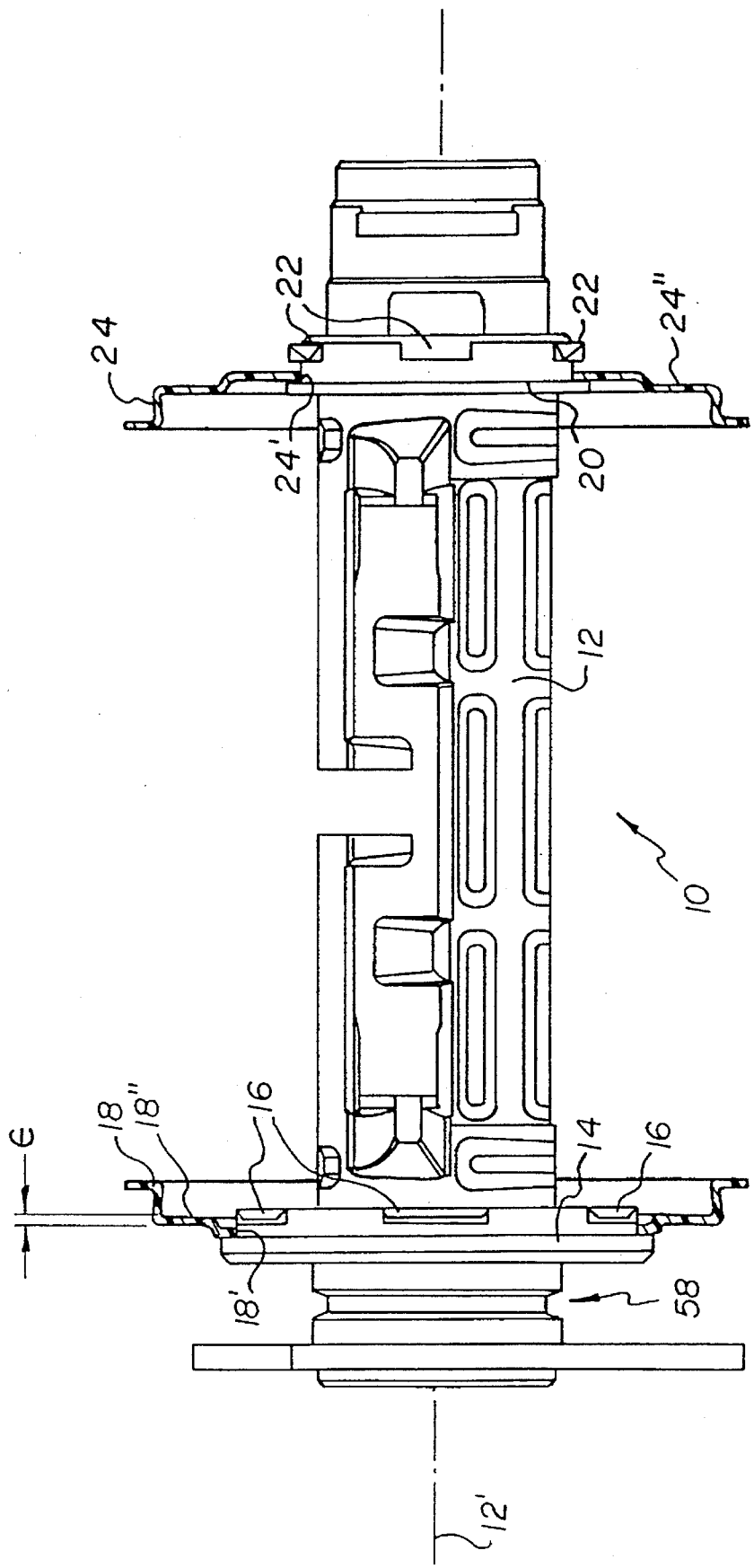
FIG. 2 shows an elevation view, partially in section, of the spool with its end disks installed.
Figure 16:
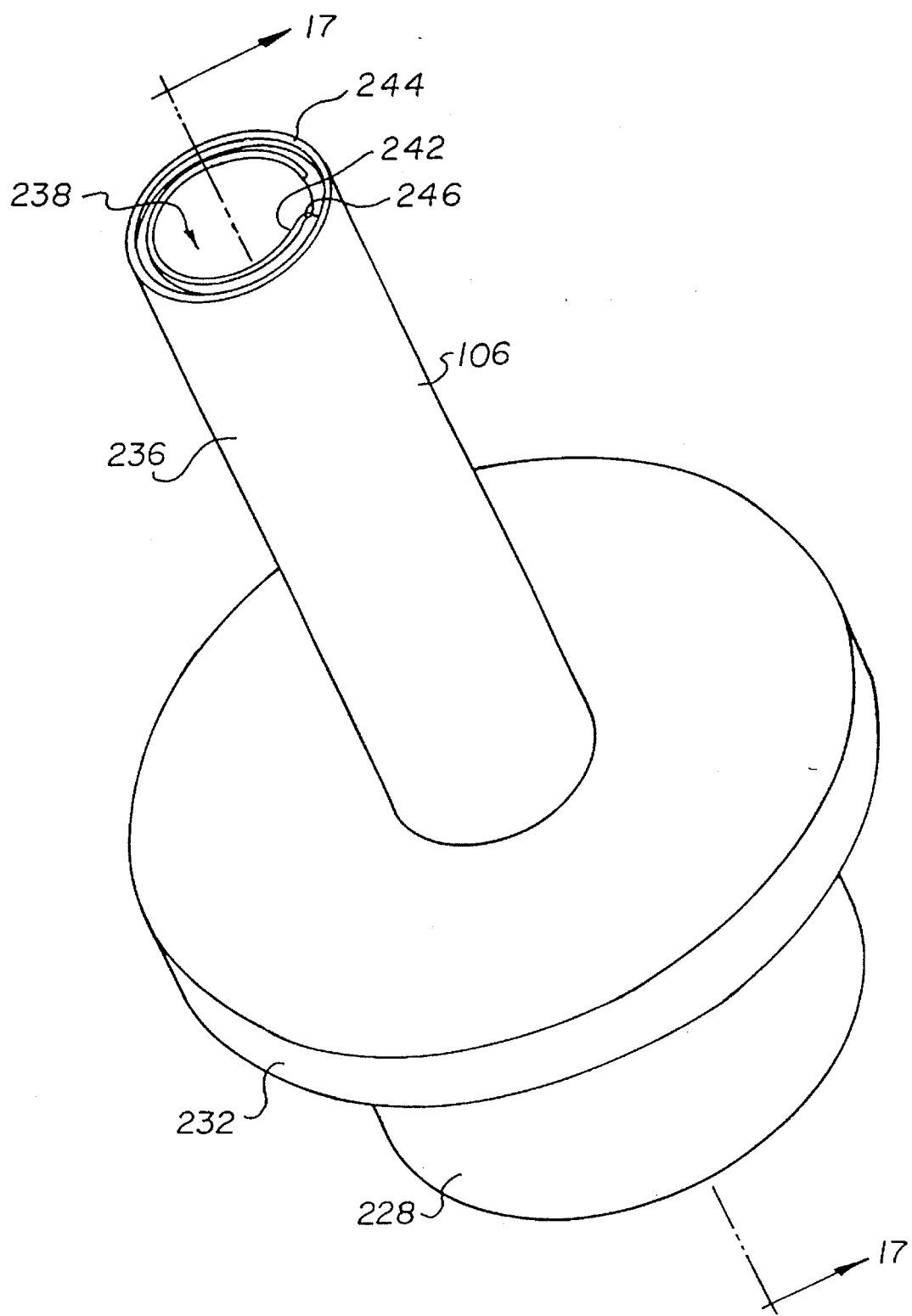
FIG. 16 shows a perspective view of a tool used to install end disk 18 of FIG. 2.

FIGS. 16 to 18 illustrate the primary features of tool 106 for installing end disks 18, 24. Regardless of the disk being installed, each tool 106 comprises a cylindrical base 228 for precise, rotatable mounting in sleeve bearing 222. An eccentric, axially extended blind bore 230 is provided in base 228 for receiving pin 220. A radially extended bearing flange 232 is provided above base 228 to engage an annular thrust bearing 234 provided in housing 214. See FIG. 15. A central shaft 236 extends upwardly from flange 232. In the version of tool 106 for installing end disk 18, illustrated in FIGS. 16 and 17, shaft 236 includes a central blind bore 238 having a depth slightly longer than the length of core 12 to the fight of flange 14 as seen in FIG. 2. In the version of tool 106 for installing end disk 24, illustrated in FIG. 18, shaft 236 includes a central blind bore 240 having a depth slightly longer than the length of core 12 to the fight flange 20 as seen in FIG. 2.

Figure 17A:
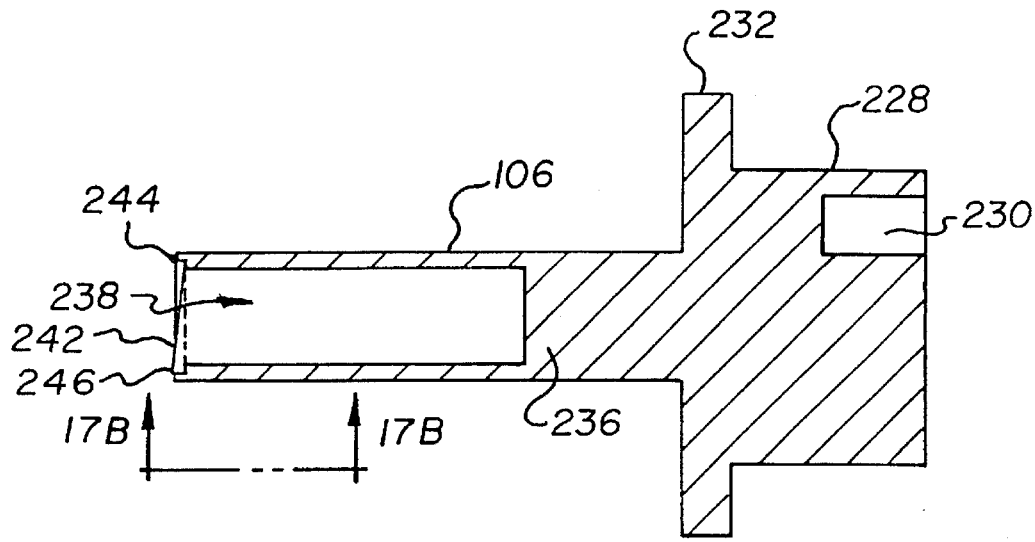
FIG. 17A shows a sectional view along line 17—17 of FIG. 16.
Figure 17B:
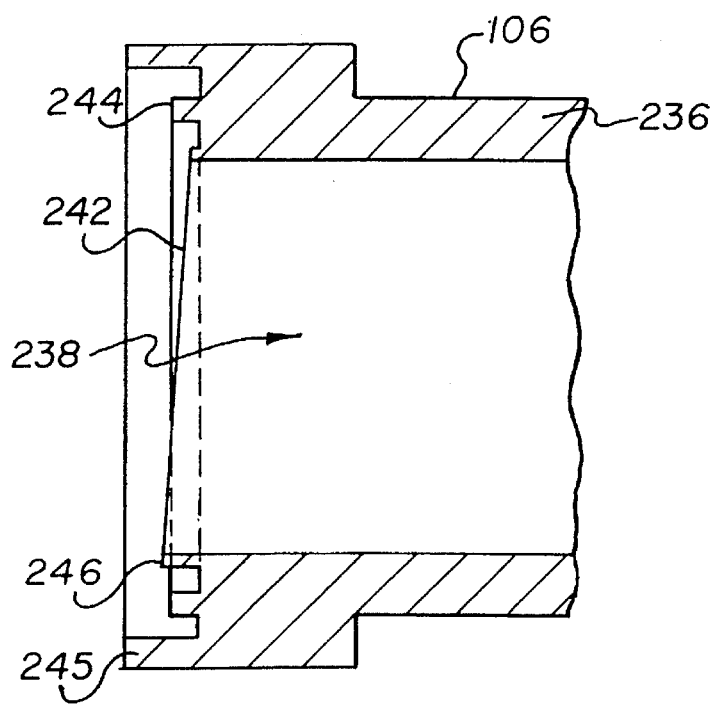
FIG. 17B shows an enlarged sectional view of the spiral ramp and surrounding land which force end disk 18 into place when the tool is rotated.

As illustrated in FIGS. 17A and 17B, a spiral ramp 242 extends approximately 305° around central bore 238. The inside diameter of ramp 242 is chosen so that the ramp will engage end disk 18 just radially outside of inside diameter 18'. Surrounding ramp 242 is an annular land 244 whose end surface is essentially planar and perpendicular to the axis of rotation of the tool. Land 244 has a diameter chosen so that the land will engage end disk 18 on a radially outboard annular surface 18". Surrounding and extending past land 244 is an axially extended land 245 within which end disk 18 is captured during operation. A lead edge 246 of ramp 242 provides essentially a single point of contact with end disk 18 and extends beyond the plane of land 144 to a distance approximately 0.005 to 0.010 inch (0.127 to 0.254 mm) greater than the depth ∈ of a recess surrounding inside diameter 18', as shown in FIG. 2. Edge 246 preferably comprises an essentially flat land of about 10° extent circumferentially. Though essentially single point contact is preferred, those skilled in the art will appreciate that a plurality of points or a continuous land extending along an arc up to about 45° in circumferential extent, also may be used without departing from the scope of our invention. The height of lead edge 246 is chosen to be sufficient to press end disk 18 beyond tabs 16. In use of the tool of FIGS. 16 and 17, end disk 18 is deposited in bore 128 by shuffle assembly 102 and drops over the end of tool 106 positioned within bore 128. Motor 190 is then actuated to raise tool 106 through bore 128, so that core 12 is telescopically received in bore 238. Eventually, lead edge 246 presses a portion of end disk 18 against one of tabs 16. Motor 216 is then actuated to rotate tool 106 approximately 720° while the tool continues to advance under the control of motor 190. As a result of such continued advancement and rotation of tool 106, lead edge 246 and ramp 242 cause the end disk to snap past tabs 16 one by one until a successful installation is achieved. Because single point engagement is used, the end disk is free to move radially through a clearance between diameter 18' and spool 12, thus easing passage over tabs 16 and minimizing chances of damaging the disk.

Figure 18A:
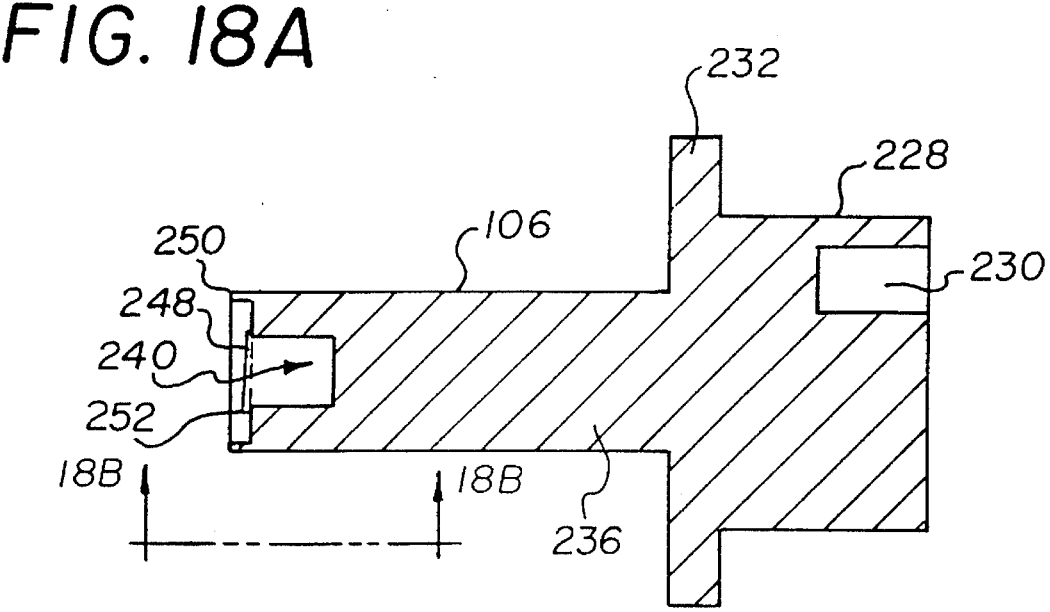
FIG. 18A shows a sectional view similar to FIG. 17A of a tool used to install end disk 24 of FIG. 2.
Figure 18B:
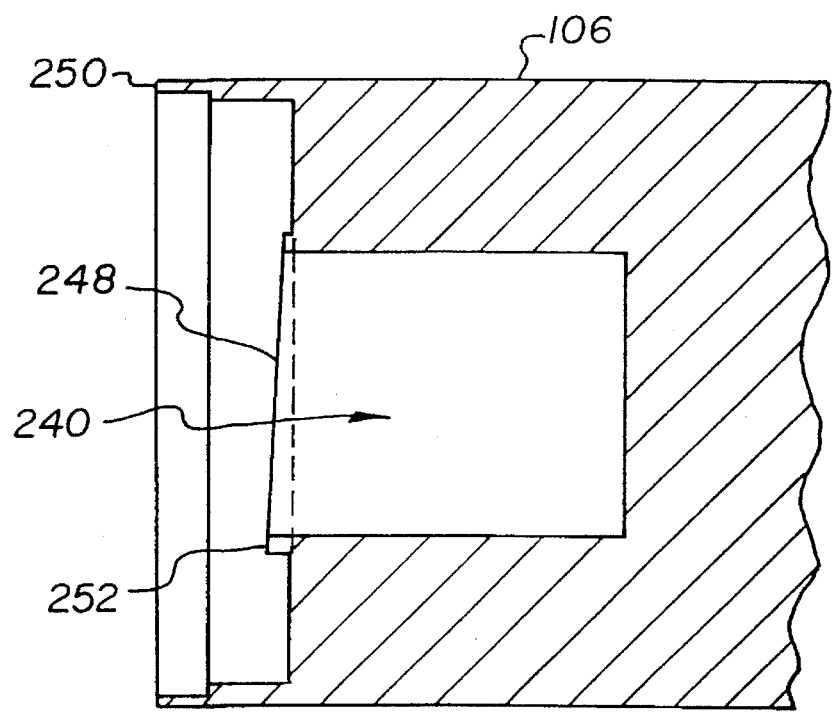
FIG. 18B shows an enlarged sectional view of the spiral ramp and surrounding land which force end disk 24 into place when the tool is rotated.
Figure 19:
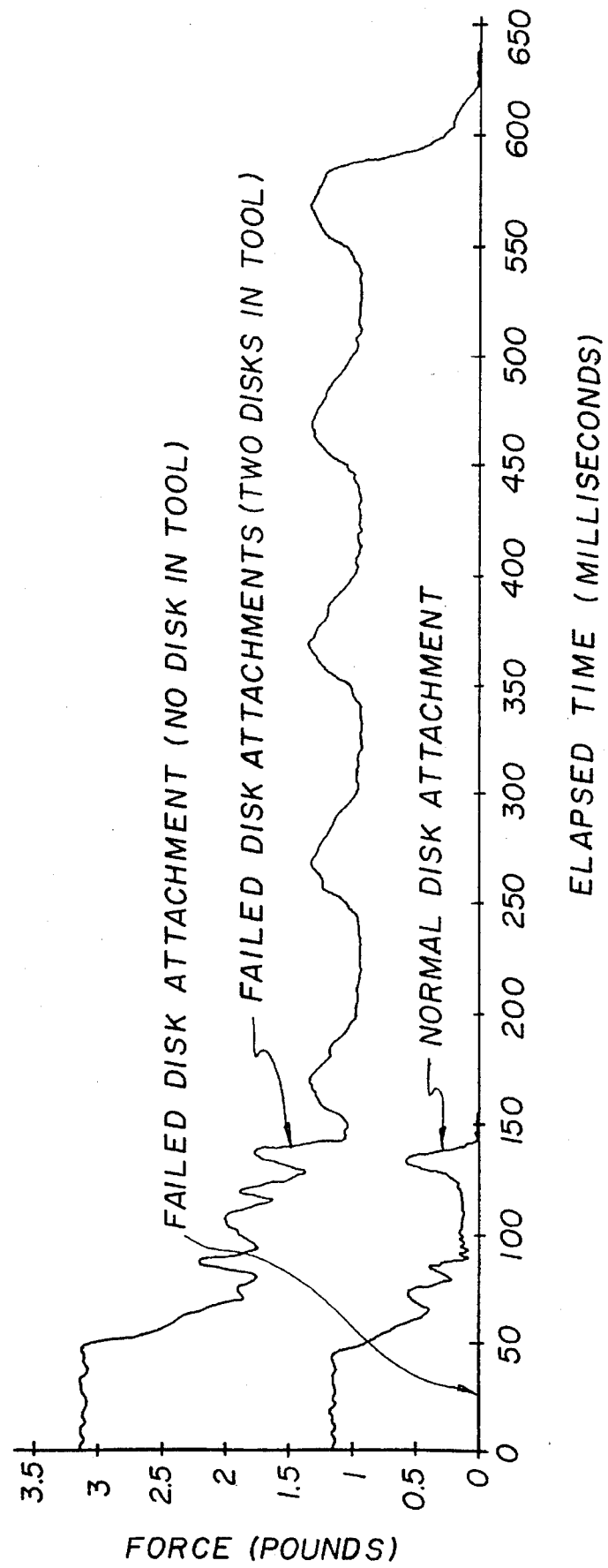
FIG. 19 shows a plot of the load cell output versus time for successful and failed disk installations.

As illustrated in FIGS. 18A and 18B, tool 106 for installing end disk 24 comprises a spiral ramp 248 extended approximately 305° around central bore 240. The inside diameter of ramp 248 is chosen so that the ramp will engage end disk 24 just radially outside of inside diameter 24'. Surrounding and extending axially beyond ramp 248 is a stepped, annular land. 250 whose end surface is essentially planar and perpendicular to the axis of rotation of the tool. Land 250 has an inside diameter chosen so that end disk 24 will drop through bore 128 and fall within a pocket defined by land 250. A lead edge 252 of ramp 248 provides a single point of contact with end disk 24 at a location just radially outside of diameter 24. The use of the tool of FIGS. 18A and 18B is the same as that of FIGS. 16 and 17.

Those skilled in the art will appreciate, without further elaboration in this specification, that the sequential operation of conveyor 78, of air cylinders 84, 132, 150 and 170 and of motors 190 and 216 may be coordinated through use of a conventional programmable controller 254, as illustrated schematically in FIG. 7.

FIG. 19 illustrates the force measured by load cell 158 as a function of time during rotation of tool 106. There are three separate disk attachment attempts recorded in FIG. 19. For all three attempts, tool 106 was raised into position and then spun for several revolutions at a speed of 600 rpm. This equates to a period of rotation of about 100 milliseconds. For all three, rotation was begun at approximately 50 milliseconds into the trace. One of the traces is for a normal, successful disk attachment. Note that this trace initially has a force of approximately 1.2 pounds (0.544 kg) and that this force falls to zero after the first revolution of tool 106, which indicates that the end disk has successfully passed the snaps or flange on the spool. In order to illustrate a failed attachment, two other attachments were attempted with improper conditions. One failed attempt was created by removing the disk from tool 106 prior to the beginning of the attachment cycle. In this case, no force was exerted against the load cell and the corresponding trace has a force of zero for the entire duration of the attachment cycle. The second improper condition was created by loading two disks into tool 106 prior to beginning the attachment cycle. In this case the initial force is much higher and after one rotation of the tool, the force has not fallen off to zero, as would be expected for a proper disk installation. Those skilled in the an will appreciate that controller 254 may be readily programmed to detect a proper initial force and a drop off to zero after the first revolution of tool 106, the forces having values and occurring within a time frame easily determined by calibration; and to control the apparatus as appropriate in response to a successful or unsuccessful installation of an end disk.

Parts List

10 . . . spool to be assembled

12 . . . core or arbor to which film may be attached

12' . . . axis of rotation of 12

14 . . . large end flange

16 . . . radially protruding, circumferentially spaced retainer tabs

18 . . . ranged end disk

18' . . . large inside diameter of end disk 18

18" . . . annular surface of end disk 18

20 . . . small end flange

22 . . . radially protruding, circumferentially spaced retainer tabs

24 . . . ranged end disk

24' . . . small inside diameter of end disk 24

24" . . . annular surface of end disk 24

30 . . . pallet

32 . . . rectangular base

34 . . . pads or glides

36 . . . spool nest

38 . . . base block

40 . . . top flange

42 . . . bottom flange

44 . . . recess

46 . . . elongated pivot arm

48 . . . flexural pivot

50 ... actuation end of 46
52 ... cam follower roller
54 ... spool engagement end of 46
56 ... movable nest recess in 54
58 ... reduced diameter on spool 10 above flange 14 and tabs 16
60 ... extension of flange 42
62 ... fixed arm
64 ... engagement end of 62
66 ... fixed nest stop on 64 opposite recess 56
68 ... pivot arm return pawl
70 ... mounting bolt
72 ... torsion spring
74 ... base plate
76 ... frame
78 ... conveyor for pallet 30
80 ... fixed lateral guide
82 ... movable lateral guide
84, 86 ... slides
88 ... actuator cylinder
90 ... support stand
92 ... vertical leg
94 ... horizontal arm
96 ... force transducer assembly
98 ... nest cracking assembly
100 ... frame
102 ... end disk delivery shuttle assembly
104 ... end disk installation assembly
106 ... end disk installation tool
108 ... support bracket
110 ... elongated block
112 ... upwardly opening slot on 110
114 ... shuttle
116 ... reduced thickness extension of 114
118 ... reduced depth extension of 112
120 ... U-shaped recess open to underside and one edge of 116
122 ... feed track for end disks
124 ... cover
126 ... hinge
128 ... bore through 110 into 118
130 ... bracket
132 ... air cylinder
134 ... rod
136 ... stop abutment on 114
138 ... stop mourned to 110
140 ... horizontal arm perpendicular to arm 94
142 ... mounting plate secured to 140
144 ... U-shaped bracket
146 ... upper arm
148 ... lower arm
150 ... air cylinder
152 ... rod
154 ... stop plate
156 ... bore in 148
158 ... load cell
160 ... load cell pad or foot
162 ... mounting plate secured to 94
164, 166 ... slides mounted to 162
168 ... mounting block mounted to 164, 166
170 ... air cylinder
172 ... rod
174 ... stop arm
176 ... stop pad
178 ... block
180 ... cam finger
182 ... bolt
184 ... torsion spring
190 ... motor mounted to frame 100
192 ... shaft
194 ... driver hub
196 ... eccentric drive pin
198 ... slide block
200 ... slide
202, 204 ... bracket
206 ... bracket plate of frame 100
208 ... slide block
210 ... slide supporting 202, 204
212 ... motor bracket
214 ... cylindrical bearing housing
216 ... motor
218 ... driven hub
220 ... eccentric drive pin engages tool 106
222 ... sleeve bearing
224 ... 1tool retainer
228 ... cylindrical base rotatably received in 222
230 ... eccentric blind bore to mate with 220
232 ... radial bearing flange
234 ... annular thrust bear'rag
236 ... central shaft
238 ... bore in 236 for tool to install end disk 18
240 ... bore in 236 for tool to install end disk 24
242 ... spiral ramp surrounding bore 238
244 ... annular land surrounding 242
245 ... annular land surrounding 244
246 ... lead edge of 242
ε ... recess depth on end disk 18
248 ... spiral ramp surrounding bore 240
250 ... annular land surrounding 248
252 ... lead edge of 248
254 ... electrical and pneumatic controller While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for assembling an arbor having an axis and a plurality of radially extending protuberances for positioning a part and a part having a through opening for axially receiving the arbor, the apparatus comprising:

means for holding the arbor;

means for sliding the part onto the arbor;

means for applying axial force to the part at least at one point of application spaced radially from the axis while moving the point around the axis, thereby moving the part past the protuberances;

means for measuring axial force applied to the arbor as an indication that the pan has passed the protuberances; and means for ceasing the applying of force in response to the indication.

2. Apparatus according to claim 1, wherein the means for holding the arbor comprises:

a base block;

a first arm pivotably mounted to the base block;

means on the first arm for receiving the arbor at a location spaced axially from the protuberances;

a second arm mounted on the base block; and means for biasing the first arm toward the second arm to hold the pan between the arms.

3. Apparatus according to claim 2, wherein the means for holding the arbor further comprises:

means for rotating the first arm away from the second arm to permit the part to move axially in response to the axial force.

4. Apparatus according to claim 3, wherein the means for holding further comprises:

a conveyor for moving the base block, with an arbor held between the first and second arms, to a position for installation of the pan; and means mounted adjacent the conveyor for engaging the means for rotating.

5. Apparatus according to claim 4, further comprising means for moving the means for engaging into position for engaging the means for rotating.

6. Apparatus according to claim 5, wherein the means for moving comprises a stop for limiting rotation of the first arm away from the second arm following engagement with the means for rotating.

7. Apparatus according to claim 4, further comprising means mounted adjacent the conveyor for positioning the base block transversely of the conveyor during installation of the part.

8. Apparatus according to claim 1, wherein the means for measuring axial force comprises:

a force transducer;

an engagement pad connected to the force transducer; and means for moving the transducer and pad into contact with an end of the arbor prior to application of the axial force.

9. Apparatus according to claim 1, wherein the means for sliding the part comprises:

a tool member having a central bore for telescopically receiving a portion of the arbor;

an end portion surrounding the central bore for supporting the part; and means for moving the tool member to insert the arbor through the opening of the part and into the central bore, while the part is supported on the end portion.

10. Apparatus according to claim 9, wherein the means for applying axial force comprises:

a spiral ramp surrounding the central bore, the ramp having a leading edge for engaging the part at the point of application; and means for rotating the tool member to move the point around the axis and move the opening of the part past the protuberance.

11. Apparatus according to claim 9, further comprising:

means for placing the part on the end portion of the tool member.

12. A method for assembling an arbor having an axis and a plurality of radially extending protuberances for positioning a part and a part having a through opening for axially receiving the arbor, comprising the steps of:

holding the arbor;

sliding the part onto the arbor;

applying axial force to the part at least at one point of application spaced radially from the axis while moving the point around the axis, thereby moving the part past the protuberances;

measuring axial force applied to the arbor as an indication that the part has passed the protuberances; and ceasing the applying of force in response to the indication.

13. A method according to claim 12, wherein the applying step comprises the steps of:

providing a tool member having a central bore for telescopically receiving a portion of the arbor and a spiral ramp surrounding the central 'bore, the ramp having a leading edge for engaging the part at the point of application;

moving the tool member to insert the arbor into the central bore following sliding of the part onto the arbor; and rotating the tool member while applying axial force to the part.

14. A method according to claim 13, wherein the tool member has an end portion surrounding the central bore :for supporting the part and the sliding step occurs during moving of the tool member.

* * * * *